(12) United States Patent
Shih et al.

(10) Patent No.: US 6,491,456 B2
(45) Date of Patent: Dec. 10, 2002

(54) KEYBOARD THIN FILM CIRCUIT BOARD WITH TRENCHES TO RELEASE AIR FROM HOLLOW RUBBER DOMES

(75) Inventors: Sheng-Fang Shih, Tu-Cheng (TW); Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/881,030

(22) Filed: Jun. 15, 2001

(65) Prior Publication Data

US 2002/0009322 A1 Jan. 24, 2002

(30) Foreign Application Priority Data

Jun. 23, 2000 (TW) ........................................ 89112375 A

(51) Int. Cl.⁷ .............................................. H01H 13/70
(52) U.S. Cl. ...................... 400/473; 400/490; 400/479; 345/168; 361/680; 200/5 A
(58) Field of Search ................................. 400/472, 473, 400/479.1, 479.2, 480, 481, 490, 491, 491.1, 491.2, 493.1, 479; 345/168; 361/680; 200/5 A

(56) References Cited

U.S. PATENT DOCUMENTS

| 4,128,744 A | * | 12/1978 | Seeger ........................ 200/292 |
| 4,322,587 A | * | 3/1982 | Burns et al. ............. 200/302.1 |
| 5,149,923 A | * | 9/1992 | Demeo ........................ 200/314 |
| 5,607,048 A | * | 3/1997 | Kaizu et al. ................ 200/313 |
| 5,664,667 A | * | 9/1997 | Kenmochi ................... 200/305 |
| 5,669,486 A | * | 9/1997 | Shima ........................ 200/313 |
| 5,842,798 A | * | 12/1998 | Su ............................. 400/472 |
| 5,960,942 A | * | 10/1999 | Thornton .................... 200/314 |
| 5,981,890 A | * | 11/1999 | Chen .......................... 200/515 |
| 6,028,591 A | * | 2/2000 | Lueders ...................... 345/104 |
| 6,135,886 A | * | 10/2000 | Armstrong .................. 463/37 |
| 6,198,060 B1 | * | 3/2001 | Yamazaki et al. .......... 200/305 |
| 6,376,789 B2 | * | 4/2002 | Maruyama et al. ......... 200/344 |

* cited by examiner

Primary Examiner—Andrew H. Hirshfeld
Assistant Examiner—Dave A. Ghatt
(74) Attorney, Agent, or Firm—Winston Hsu

(57) ABSTRACT

A key signal-generating device has a thin film circuit board to generate key signals and a plurality of hollow rubber domes set on the thin film circuit board that are compressed by their corresponding keys to activate the thin film circuit board to generate corresponding signals. The rubber domes have a predetermined space that is filled with air. The thin film circuit board has a top surface and a trench on the top surface. One end of the trench extends into the predetermined space so that the predetermined space is in communication with the atmosphere. When a key is pressed, the corresponding rubber dome is squeezedby the key, causing the air in the predetermined space to exit out to the atmosphere through the trench.

9 Claims, 5 Drawing Sheets

KEYBOARD THIN FILM CIRCUIT BOARD WITH TRENCHES TO RELEASE AIR FROM HOLLOW RUBBER DOMES

BACKGROUND OF THE INVENTION

1. Field of the Invention

The invention relates to a key signal-generating device for a keyboard, and more particularly, to a key signal-generating device with a trench to release air.

2. Description of the Prior Art

Please refer to FIG. 1 and FIG. 2. FIG. 1 is a schematic diagram of a prior art key signal-generating device 10. FIG. 2 is a section view along line 2—2 of the prior art key signal-generating device 10 of FIG. 1. The key signal-generating device 10 generates key signals in a keyboard. The key signal-generating device 10 has a thin film circuit board 18 to generate key signals, and a plurality of rubber domes 20 on a top surface 22 of the thin film circuit board 18 to support a key 16. The rubber dome 20 is fixed by a glue layer 30 to the top surface 22 of the thin film circuit board 18.

As shown in FIG. 2, the thin film circuit board 18 has a plurality of pressure sensors 32 that correspond to the rubber domes 20. Each rubber dome 20 has a base 24, a predetermined space 26 filled with air within the rubber dome 20, and an orifice 28 in the base 24 to communicate the pressure in the predetermined space 26 with the atmosphere. When a user presses the key 16, the rubber dome 20 is squeezed by the key 16 to activate the pressure sensor 32, and a signal is generated correspondingly. The air in the predetermined space 26 is released to the outside atmosphere through the orifice 28, as shown by arrow 34.

But the prior art key signal-generating device 10 has some defects. First, the orifice 28 is formed in the base 24, so the thickness of the base cannot be reduced. Second, while the rubber dome 20 is being fixed onto the thin film circuit board 18, the orifice 28 must be carefully aligned with an indenture 31 in the glue layer 30 shown in the FIG. 1, or the orifice 28 will be blocked by the glue of the glue layer 30 and the key signal-generating device 10 will malfunction.

SUMMARY OF THE INVENTION

It is therefore a primary objective of the present invention to provide a key signal-generating device with a trench to release air from the hollow rubber dome to solve the above-mentioned problem.

According to the claimed invention, the key signal-generating device has a trench to release air. The device includes a thin film circuit board set on a base to generate key signals. The thin film circuit board has a top side and at least one trench on the top side. The device also includes at least one hollow rubber dome set on the thin film circuit board that extends out from the top side of the thin film circuit board to provide elastic support for a key structure. The rubber dome has a predetermined space that is filled with air. One end of the trench extends into the predetermined space so that the predetermined space is in communication with the atmosphere. When the key structure is pressed, the rubber dome is squeezed down by the key structure, causing air in the predetermined space to be released to the atmosphere through the trench.

It is an advantage according to the present invention that the key signal-generating device with a trench to release air has a thinner base and is easier to assemble.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
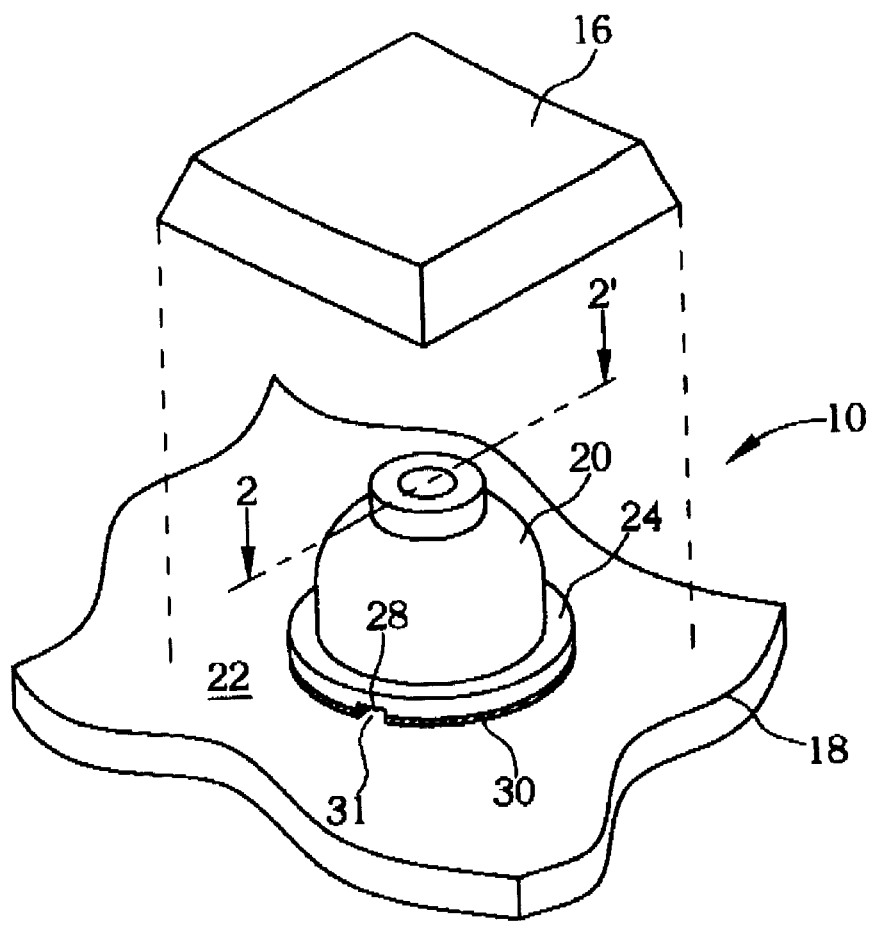
FIG. 1 is a schematic diagram of a prior art key signal-generating device.
Figure 2:
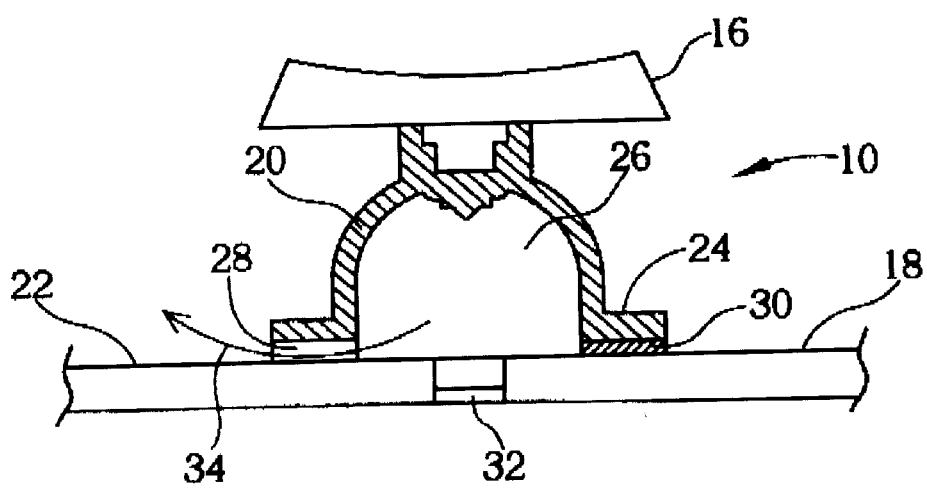
FIG. 2 is a section view along line 2—2 of the key signal-generating device of FIG. 1.
Figure 3:
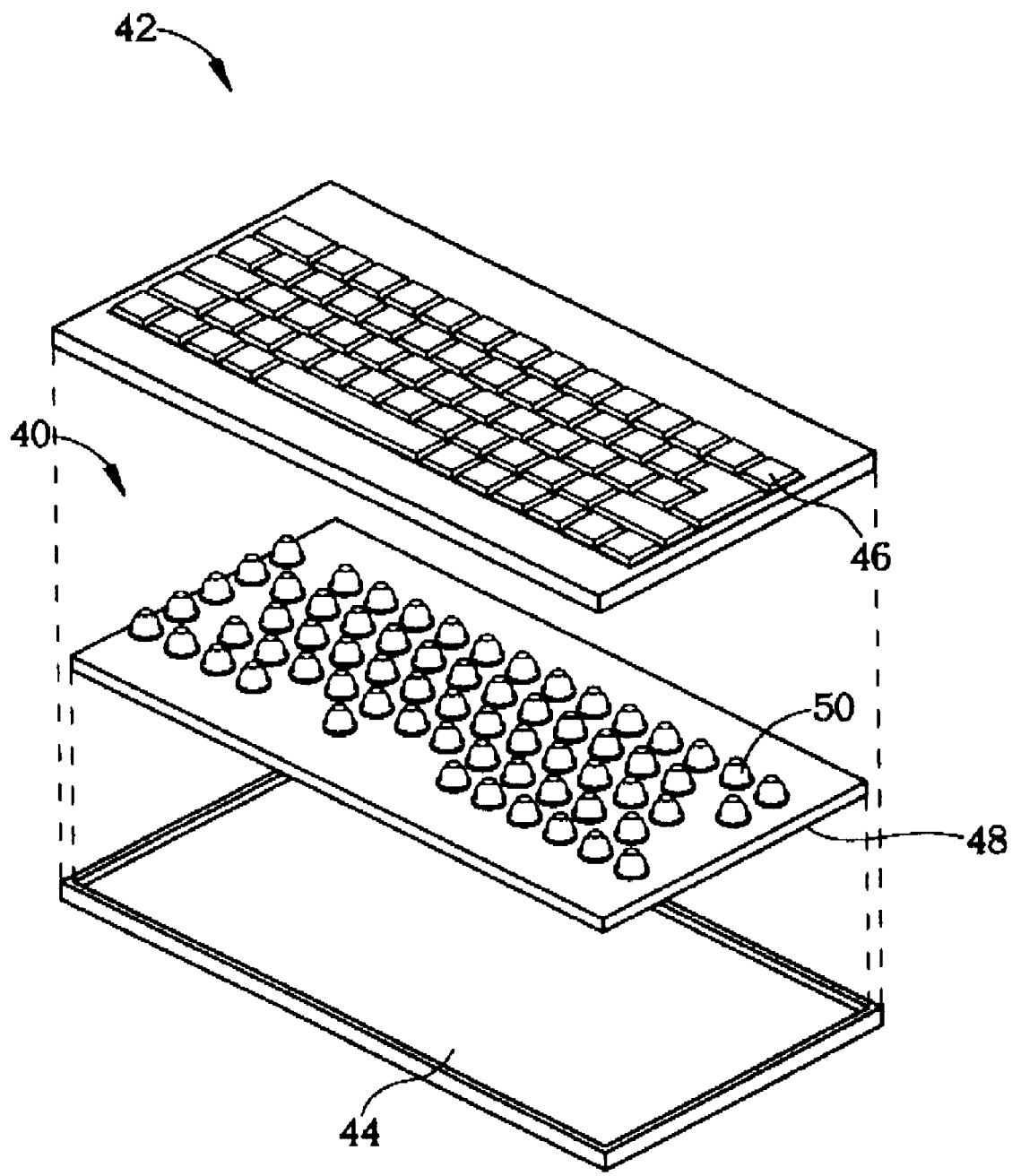
FIG. 3 is a schematic diagram of a key signal-generating device of the present invention used in a keyboard.

Please refer to FIG. 3. FIG. 3 is a schematic diagram of a key signal-generating device 40 of the present invention used in a keyboard 42. The key signal-generating device 40 is used in a keyboard 42 to generate key signals. The keyboard 42 has a base 44 and a plurality of keys 46. The key signal-generating device 40 is set between the base 44 and the plurality of keys 46. The key signal-generating device 40 has a thin film circuit board 48 fixed on the base 44 to generate key signals and a plurality of hollow rubber domes 50 set on the thin film circuit board 48 to elastically support the keys 46.

Figure 4:
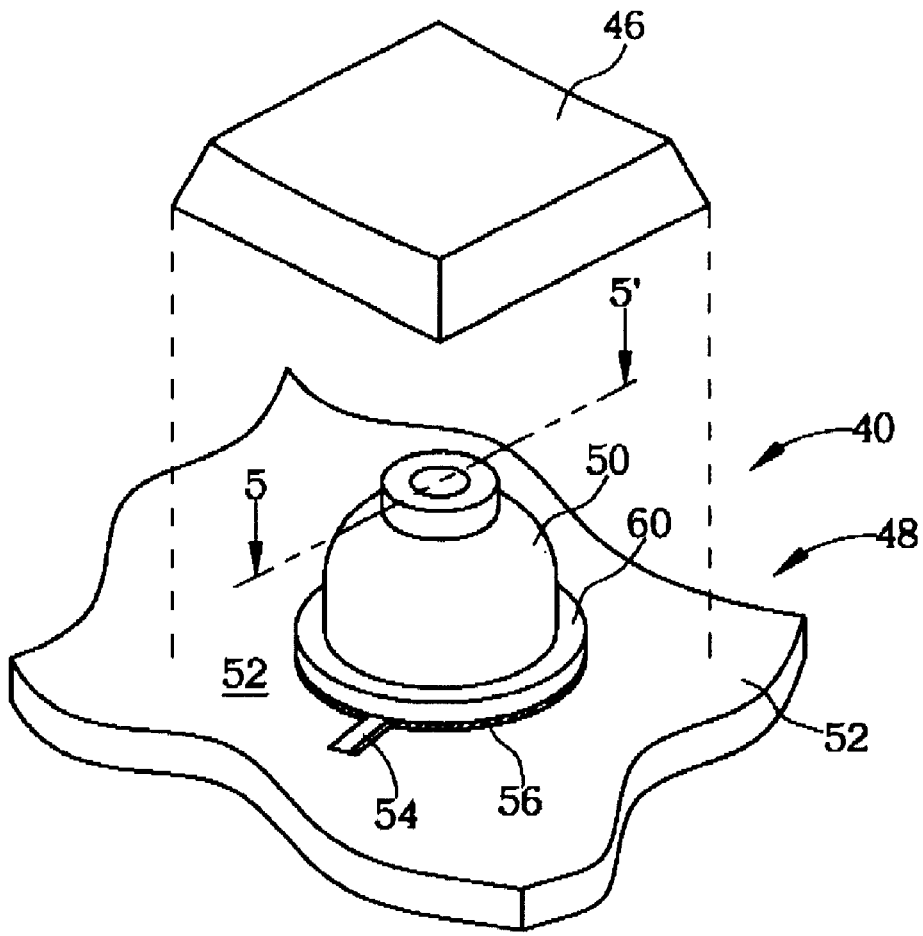
FIG. 4 is a schematic diagram of the key signal-generating device of FIG. 3.
Figure 5:
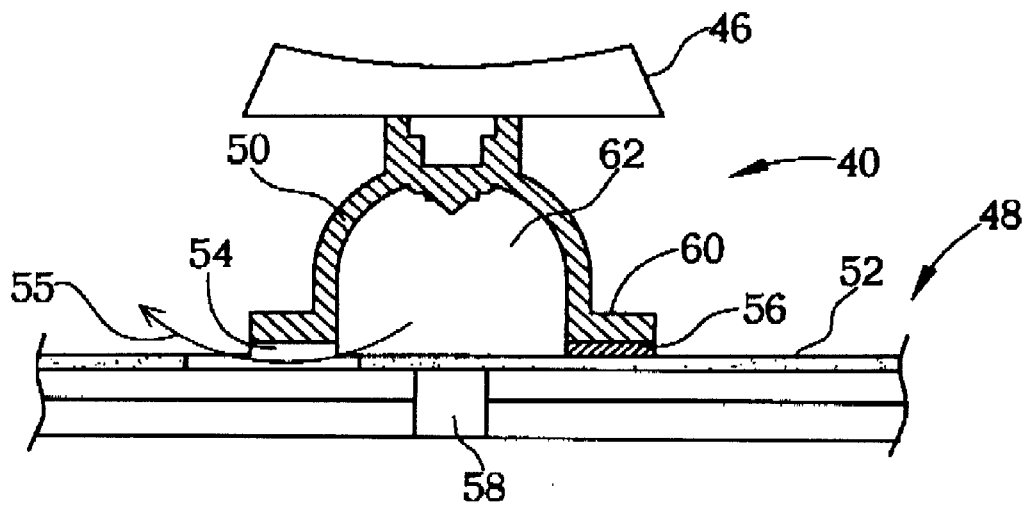
FIG. 5 is a section view along line 5—5 of the key signal-generating device of FIG. 4.

Please refer to FIG. 4 and FIG. 5. FIG. 4 is a schematic diagram of the key signal-generating device 40. FIG. 5 is a sectional view along line 5—5 of the key signal-generating device of FIG. 4. The thin film circuit board 48 has a top surface 52 and a trench 54 on the top surface 52. The rubber domes 50 are glued by a glue layer 56 to the top surface 52 of the thin film circuit board 48 and protrude from the top surface 52 of the thin film circuit board 48.

The thin film circuit board 48 has a plurality of pressure sensors 58 set under corresponding rubber domes 50. The rubber dome 50 has a base 60 and a predetermined space 62 filled with air within the rubber dome 50. One end of the trench 54 extends into the predetermined space 62 so that the predetermined space 62 is in communication with the outside atmosphere. When a user presses the key 46, the rubber dome 50 is squeezed downward by the key 46, and the pressure sensor 58 is activated to generate a corresponding signal. Air in the predetermined space 62 is released through the trench 54 to the atmosphere, as indicated by arrow 55.

Figure 6:
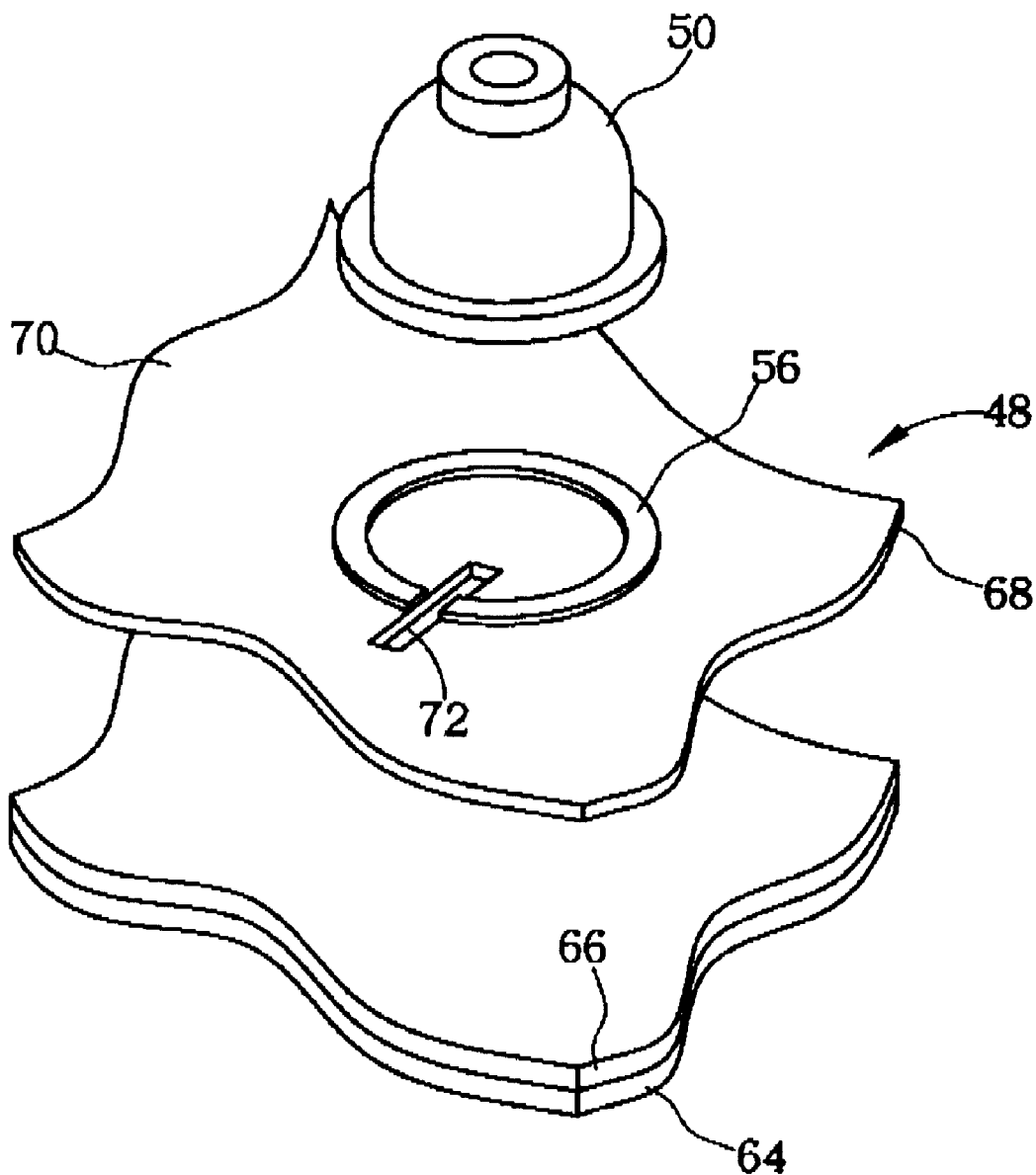
FIG. 6 is a schematic diagram of a trench indicated in FIG. 4.

Please refer to FIG. 6. FIG. 6 is a schematic diagram of the trench 54 indicated in FIG. 4. The thin film circuit board 48 has a lower thin film circuit 64, an upper thin film circuit 66 set above the lower thin film circuit 64, and a film 68 set on the upper thin film circuit 66. The film 68 has an upper surface 70 that corresponds to the top surface 52 of the thin film circuit board 48, and the trench 54 is formed with the film 68. The film 68 has an opening 72 through the film 68, and the opening 72 forms the trench 54 by the thickness of the film 68. Of course, a slot that does not penetrate all the way through the film 68 can also be used to form the trench 54.

Figure 7:
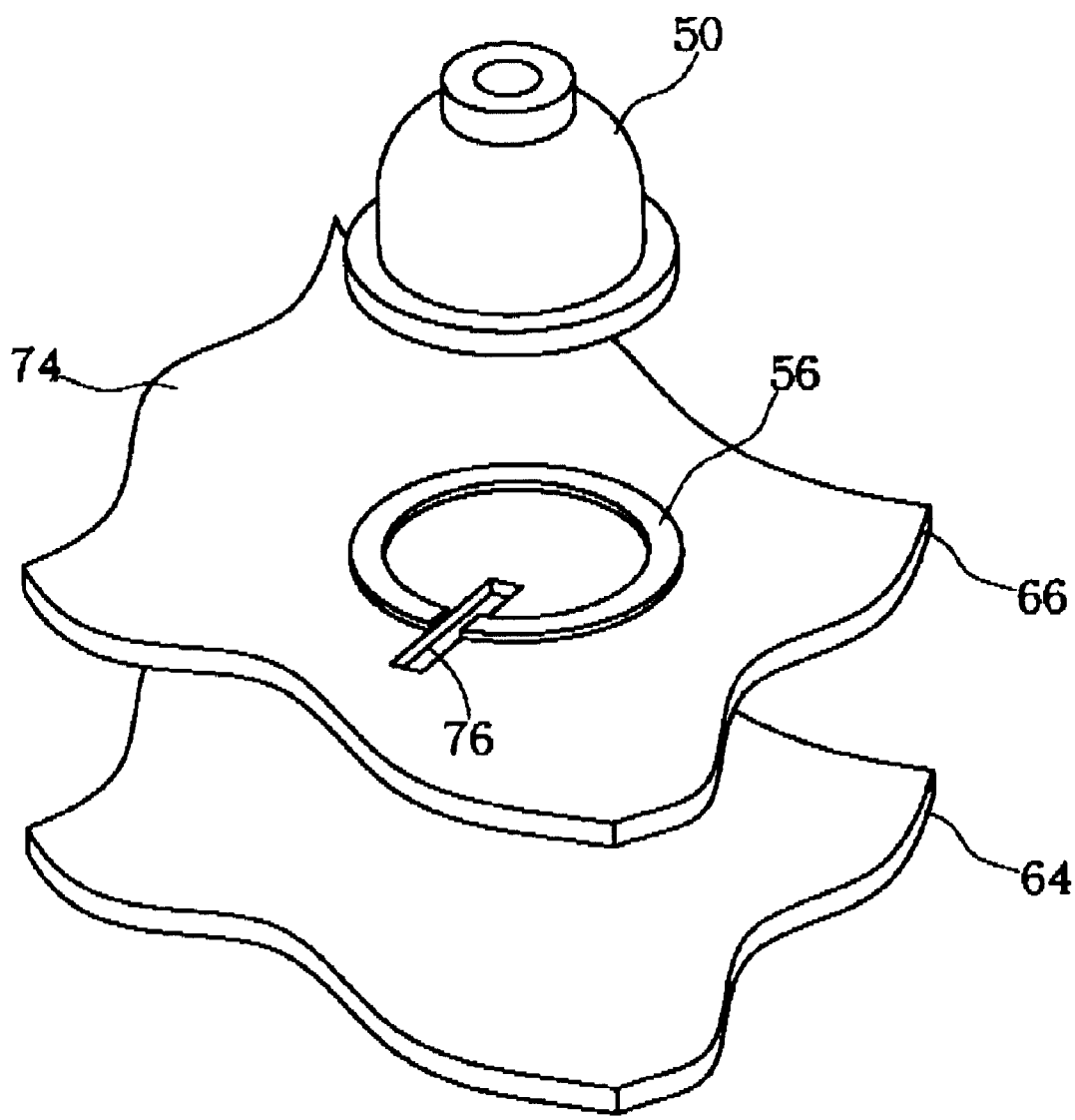
FIG. 7 is a schematic diagram of another form of trench indicated in FIG. 4.

Please refer to FIG. 7. FIG. 7 is a schematic diagram of another embodiment of the trench 54 of FIG. 4. The trench 54 can be formed on the upper thin film circuit board 66 when the film 68 is not used. As FIG. 7 shows, the upper thin film circuit board 66 has a top surface 74 that corresponds to the top surface 52 on the thin film circuit board 48. The upper thin film circuit board 66 has at least one opening 76 that penetrates through the upper thin film circuit board 66 to form the trench 54. Equivalently, a slot that does not penetrate through the upper thin film circuit 66 can also be used to form the trench 54.

Of course, formation of the trench 54 is not limited to the above methods. In fact, a depressed trough on the top surface 52 of the thin film circuit board 48 can also form the trench 54.

Compared with the prior art key signal-generating device 10, the key signal-generating device 40 of the present invention has the trench 54 as a depression on the top surface 52 of the thin film circuit board 48. The required thickness of the base 60 can consequently be reduced. Furthermore, because the trench 54 is a depression on the thin film circuit board 48, there is no alignment requirement of the prior art orifice 28 to the glue indenture 31 of the prior art key signal-generating device 10, and so larger manufacturing tolerances are possible.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A key signal generating device for a keyboard, the keyboard comprising a base and at least one key structure that is moveable in an up and down direction, the key structure being fixed on the base, the key signal generating device set between the base and the key structure and comprising:

a thin film circuit board set on the base to generate a key signal, and having a top surface, the thin film circuit board comprising a lower thin film circuit, an upper thin film circuit set above the lower thin film circuit, and a film set above the upper thin film circuit, the top surface of the thin film circuit board is the top surface of the film;

at least one trench set on the top surface of the film; and at least one hollow rubber dome set on the thin film circuit board and extending out of the top surface of the thin film circuit board to provide elastic support for the key structure, the rubber dome having a predetermined space filled with air, one end of the trench extending to the predetermined space so that the predetermined space is in communication with the atmosphere;

wherein when the key structure is pressed, the rubber dome is squeezed down by the key structure, causing air in the predetermined space to be released to the atmosphere through the trench.

2. The key signal generating device of claim 1, wherein the rubber dome is fixed on the top surface of the thin film circuit board by a glue layer.

3. The key signal generating device of claim 1, wherein the thin film circuit board further comprises at least one pressure sensor set below the rubber dome, and when the key structure is pressed, the rubber dome engages the pressure sensor and generates a corresponding sensor signal.

4. A key signal generating device for a keyboard, the keyboard comprising a base and at least one key structure that is moveable in an up and down direction, the key structure being fixed on the base, the key signal generating device set between the base and the key structure and comprising:

a thin film circuit board set on the base to generate a key signal, and having a top surface, the thin film circuit board comprising a lower thin film circuit, an upper thin film circuit set above the lower thin film circuit, and a film set above the upper thin film circuit, the top surface of the thin film circuit board is the top surface of the film;

at least one slot penetrating through the film, a trench formed within the slot by the thickness of the film;

at least one hollow rubber dome set on the thin film circuit board and extending out of the top surface of the thin film circuit board to provide elastic support for the key structure, the rubber dome having a predetermined space filled with air, one end of the trench extending to the predetermined space so that the predetermined space is in communication with the atmosphere;

wherein when the key structure is pressed, the rubber dome is squeezed down by the key structure, causing air in the predetermined space to be released to the atmosphere through the trench.

5. The key signal generating device of claim 4, wherein the rubber dome is fixed on the top surface of the thin film circuit board by a glue layer.

6. The key signal generating device of claim 4, wherein the thin film circuit board further comprises at least one pressure sensor set below the rubber dome, and when the key structure is pressed, the rubber dome engages the pressure sensor and generates a corresponding set or signal.

7. A key signal generating device for a keyboard, the keyboard comprising a base and at least one key structure that is moveable in an up and down direction, the key structure being fixed on the base, the key signal generating device set between the base and the key structure and comprising:

a thin film circuit board set on the base to generate a key signal, and having a top surface;

at least one hollow rubber dome set on the thin film circuit board and extending out of the top surface of the thin film circuit board to provide elastic support for the key structure, the rubber dome having a predetermined space filled with air; and at least one trench set in the top surface of the thin film circuit board, an end of the trench opening into the predetermined space and another end of the trench opening into ambient air above the top surface of the thin film circuit board;

wherein when the key structure is pressed, the rubber dome is squeezed down by the key structure, causing air in the predetermined space to be released to the atmosphere through the trench.

8. The key signal generating device of claim 7 wherein the trench is disposed between a lower edge of the rubber dome closest to the thin film circuit board and the base.

9. The key signal generating device of claim 7 further comprises a glue layer for fixing the rubber dome to the thin film circuit board and the trench is disposed between the glue layer and the thin film circuit board.

* * * * *